US012722726B2

(12) United States Patent
Witt et al.

(10) Patent No.: US 12,722,726 B2
(45) Date of Patent: Sep. 1, 2026

(54) AXLE LIFTING SYSTEM FOR CRANE AND RELATED METHODS

(71) Applicant: LINK-BELT CRANES, L.P., LLLP, Lexington, KY (US)

(72) Inventors: Jonathan Witt, Nicholasville, KY (US); Stuart Ross, Lexington, KY (US); Adam Chalin, Lexington, KY (US); Brennan Behr, Lexington, KY (US); William Standiford, Richmond, KY (US); Robert Retallick, Lexington, KY (US)

(73) Assignee: LINK-BELT CRANES, L.P., LLLP, Lexington, KY (US)

( * ) Notice: Subject to any disclaimer, the term of this patent is extended or adjusted under 35 U.S.C. 154(b) by 0 days.

(21) Appl. No.: 18/946,781

(22) Filed: Nov. 13, 2024

(65) Prior Publication Data

US 2025/0153791 A1 May 15, 2025

Related U.S. Application Data

(60) Provisional application No. 63/548,301, filed on Nov. 13, 2023.

(51) Int. Cl.
*B62D 61/12* (2006.01)

(52) U.S. Cl.
CPC .................................. *B62D 61/125* (2013.01)

(58) Field of Classification Search
CPC ......... B62D 61/12; B62D 61/125; B60S 9/22; B60S 9/00; F16F 9/0209
See application file for complete search history.

(56) References Cited

U.S. PATENT DOCUMENTS 1,981,449 A * 11/1934 Fageol ................. B62D 61/125 280/686
4,065,153 A * 12/1977 Pringle .................. B60G 11/04 267/31
4,079,798 A * 3/1978 Ferris ........................ B60P 3/16 280/767

(Continued)

FOREIGN PATENT DOCUMENTS

DE 3934499 C2 * 1/1998 ............. B66C 23/62
GB 2582570 A * 9/2020 ................ B60S 9/00

OTHER PUBLICATIONS

DE_3934499_C2 machine translation from FIT (Year: 2025).*

*Primary Examiner* — S. Joseph Morano
*Assistant Examiner* — Maxwell L Meshaka
(74) *Attorney, Agent, or Firm* — Dickinson Wright PLLC; Andrew D. Dorisio

(57) ABSTRACT

A system is provided for lifting one or more axles on a lifting machine, such as a crane including a chassis, relative to the ground. The system includes a lifter for raising or lowering the axle relative to the ground. The lifter comprising a flexible connector, such as a strap, for connecting with the axle and/or a cylinder including a rod connected to the connector and adapted for substantially horizontal movement for raising or lowering the first axle. A bearing may also be provided for supporting the flexible connector during the lifting and lowering of the axle. The system may be applied to multiple axles for independent or simultaneous operation. Related methods are also provided.

20 Claims, 6 Drawing Sheets

(56) References Cited

U.S. PATENT DOCUMENTS

| | | | | | |
|---|---|---|---|---|---|
| 4,705,133 | A * | 11/1987 | Christenson | B62D 61/125 | 180/209 |
| 4,842,302 | A * | 6/1989 | Lauronen | B62D 61/125 | 280/686 |
| 5,195,771 | A * | 3/1993 | Eckert | B62D 61/125 | 267/31 |
| 5,711,504 | A * | 1/1998 | Cusimano | B60S 9/08 | 248/354.3 |
| 5,863,049 | A * | 1/1999 | Mahvi | B60P 1/027 | 280/6.151 |
| 6,135,483 | A * | 10/2000 | Metz | B62D 53/0821 | 280/439 |
| 6,416,069 | B1 * | 7/2002 | Ramsey | B60G 11/27 | 280/124.128 |
| 6,471,223 | B1 * | 10/2002 | Richardson | B60G 7/001 | 280/124.157 |
| 7,854,436 | B2 * | 12/2010 | Hock | B60G 11/27 | 280/124.128 |
| 9,415,652 | B2 * | 8/2016 | McGuire | B62D 61/125 | |
| 2009/0283980 | A1 * | 11/2009 | Hock | B62D 61/125 | 280/124.1 |
| 2024/0174042 | A1 * | 5/2024 | Jeyakar M R | B60G 17/005 | |

* cited by examiner

AXLE LIFTING SYSTEM FOR CRANE AND RELATED METHODS

This application claims the benefit of U.S. Provisional Patent Application Ser. No. 63/548,301, filed Nov. 13, 2023, the disclosure of which is incorporated herein by reference.

TECHNICAL FIELD

This disclosure relates generally to lifting machines and, more particularly, to an axle lifting system for a crane and related methods.

BACKGROUND

Cranes adapted for road travel typically include a plurality of axles, each having wheels with pneumatic tires to support the chassis during over-the-road transport. When the crane is utilized for lifting loads, such as by using a telescoping boom, outriggers deploy to engage the ground and raise the entire crane chassis, including the plurality of axles. As a result, the tires associated with the wheels separate from the ground and, thus, advantageously do not assume or experience the resulting loading as the crane is operated for lifting and transporting a load about a worksite.

When over-the-road travel is desired following such use of the crane, the operation is reversed by lowering the outriggers. As the tires re-contact the ground, a phenomenon known in the vernacular as "dock walk" occurs. This results in the entire crane rolling forward, or "walking," a significant distance, which is both unpredictable in amount and undesirable. This dock walk phenomenon can be understood with reference to FIG. 1 (outriggers O raised and note position of base B adjacent to board A on the ground G) and FIG. 2 (outriggers O lowered, tires T engaging ground, and forward movement of crane 10 resulting in distance D between base B and board A in same position as FIG. 1).

Others in the past have proposed arrangements seeking to limit the effects of dock walk. One known proposal involves the use of rigid hooks to lift the axles when the outriggers are deployed. The hooks are then used to lower the axles when the operation is reversed for over-the-road travel.

A significant limitation of this approach is a lack of flexibility in use. For instance, a crane operator may prefer to position the crane chassis on a temporary support, such as cribbing, prior to deploying the outriggers. This may place the axle or associated components out of reach of the hooks intended to lift and hold the axle in position, and render the system inoperable as a result, thus preventing it from ameliorating the dock walk phenomenon.

Accordingly, a need is identified for an axle lifting system that serves to limit or eliminate the undesirable "dock walk" phenomenon. The system would be simple to implement and use, and contribute to an overall increase in efficiency in terms of operation of a lifting machine, especially in terms of converting it from being ready for lifting loads to over-the-road travel, or vice versa. The system would also promote flexibility in terms of use, including in connection with any proposed cribbing arrangement. Overall, a considerable improvement in the lifting machine would be realized, without a concomitant increase in complexity or cost of operation.

SUMMARY

According to a first aspect of the disclosure, a system for lifting one or more axles on a lifting machine, such as a crane including a chassis, relative to the ground is provided. The system comprises a lifter for raising or lowering the axle relative to the ground. The lifter includes a flexible connector, such as a strap, chain, cable, or the like, for connecting with the axle.

In one embodiment, the lifter further includes a cylinder including a rod adapted for substantially horizontal movement for raising or lowering the axle by virtue of movement of the strap. The system may further include a bearing for supporting the strap during the lifting and lowering of the axle. In one particular embodiment, the bearing comprises a roller.

According to a further aspect of the disclosure, a system for lifting one or more axles on a lifting machine, such as a crane including a chassis, relative to the ground. The system comprises a lifter for raising or lowering the axle relative to the ground. In this aspect, the lifter comprises a cylinder including a rod adapted for substantially horizontal movement for raising or lowering the axle.

In one embodiment, the system according to this further aspect includes a flexible strap for connecting the rod of the cylinder with the axle. The system may further include a bearing for supporting the strap during the lifting and lowering of the axle. In one particular embodiment, the bearing comprises a roller.

According to yet another aspect of the disclosure, a crane is provided, which includes a chassis, a first axle connected to the chassis, and a first lifter for raising or lowering the first axle relative to the ground. The first lifter comprises a first flexible connector for connecting with the first axle and a first cylinder including a first rod adapted for substantially horizontal movement for raising or lowering the first axle. The system further includes a first bearing for supporting the connector during the lifting and lowering of the axle.

The crane may further include a second axle connected to the chassis, and a second lifter for raising or lowering the second axle relative to the ground. The second lifter may comprise a second flexible connector for connecting with the second axle and a second cylinder including a second rod adapted for substantially horizontal movement for raising or lowering the second axle. A second bearing may also be provided for supporting the second flexible connector during the lifting and lowering of the axle. The crane may further include a drive shaft connecting the first and second axles, as well as a suspension system connecting the first axle to the chassis.

Still a further aspect of the disclosure pertains to a method of lifting an axle on a lifting machine. The method comprises raising or lowering the axle relative to the chassis of the crane using a flexible connector connected with the axle.

Yet another aspect of the disclosure relates to a method of lifting an axle on a lifting machine. The method comprises raising or lowering the axle relative to the chassis of the crane using a cylinder including a rod adapted for substantially horizontal movement for raising or lowering the axle.

This disclosure also pertains to a method of lifting an axle on a lifting machine. The method comprises raising or lowering the axle relative to the chassis of the crane using a flexible connector connected with the axle at one end and connected at another end to a rod of a cylinder. The rod is adapted for substantially horizontal movement for raising or lowering the axle to which the flexible connector is connected.

Also forming part of this disclosure is a method of lifting a plurality of axles on a lifting machine. The method includes raising or lowering the axles relative to the chassis of the crane using a flexible connector connected with each axle at one end and connected at another end to a rod of a cylinder associated with each of the plurality of axles. The rod is adapted for substantially horizontal movement for raising or lowering the axles to which the strap is connected.

BRIEF DESCRIPTION OF THE DRAWING FIGURES

DETAILED DESCRIPTION

Figure 3:
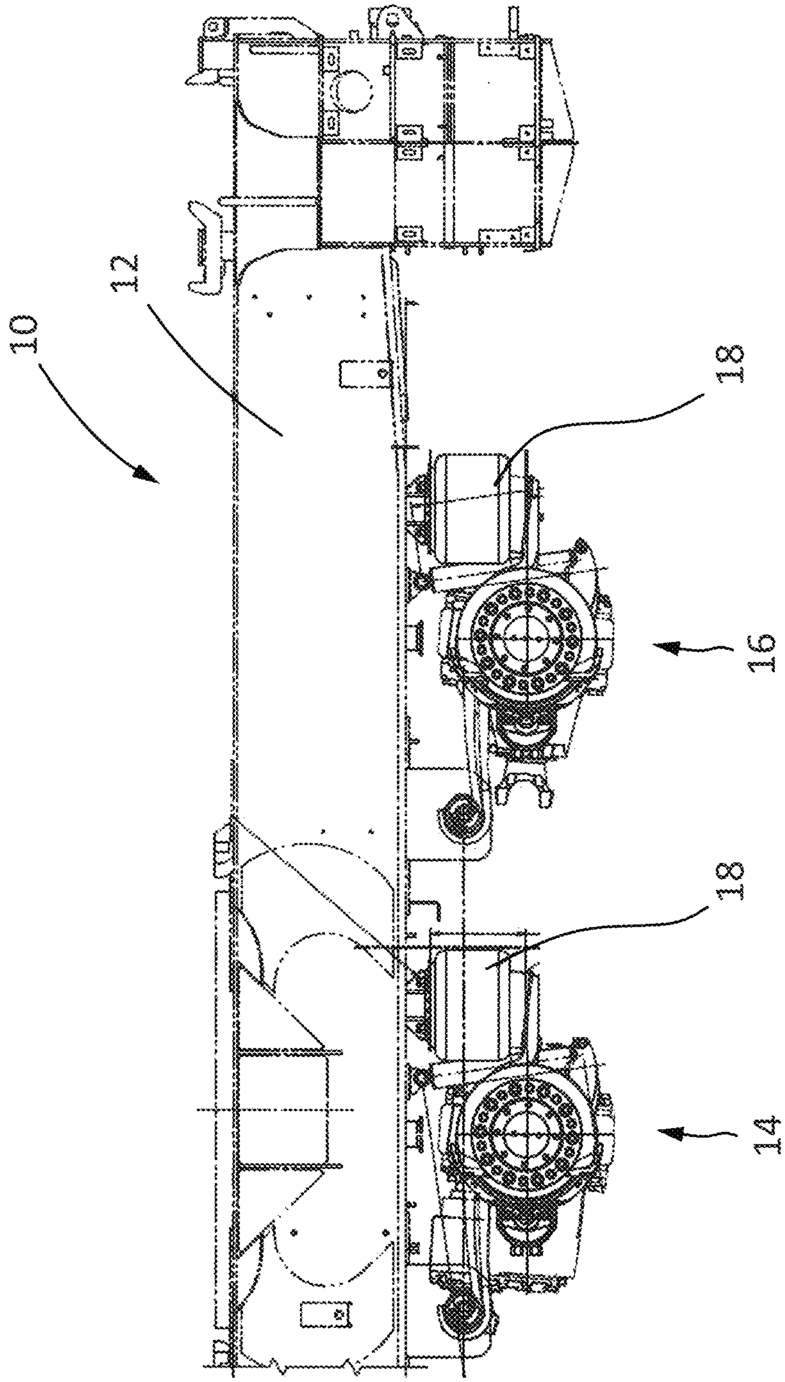
FIG. 3 is a partially cutaway side view of portion of a crane chassis including a pair of axles.

Reference is now made to FIG. 3, which provides a side view of a portion of crane 10 for which the aspect of this disclosure may have utility. In the embodiment illustrated therein, a chassis 12 for a crane 10 is partially shown. The chassis 12 connects with at least two axles, such as a first (rear) axle 14 and a second (forward) axle 16, by way of a suspension system. The suspension system may include one or more inflatable bladders 18 for controlling the height of the chassis 12 relative to the ground G depending on the level of inflation.

The axles 14, 16 may be connected together by a drive shaft 20 which transmits torque from one axle 14 to the other axle 16 via differentials (not labeled). The connections between the axles 14, 16 and the drive shaft 20 may be achieved by way of universal joints or couplings 22 to allow for relative inclination, such as during over-the-road travel or when the axles 14, 16 are raised and lowered, as outlined further in the following description. In order to further promote flexibility during these operations, the drive shaft 20 may also be adapted to permit telescoping movement to extend or retract while remaining connected to the axles 14, 16.

Figure 4:
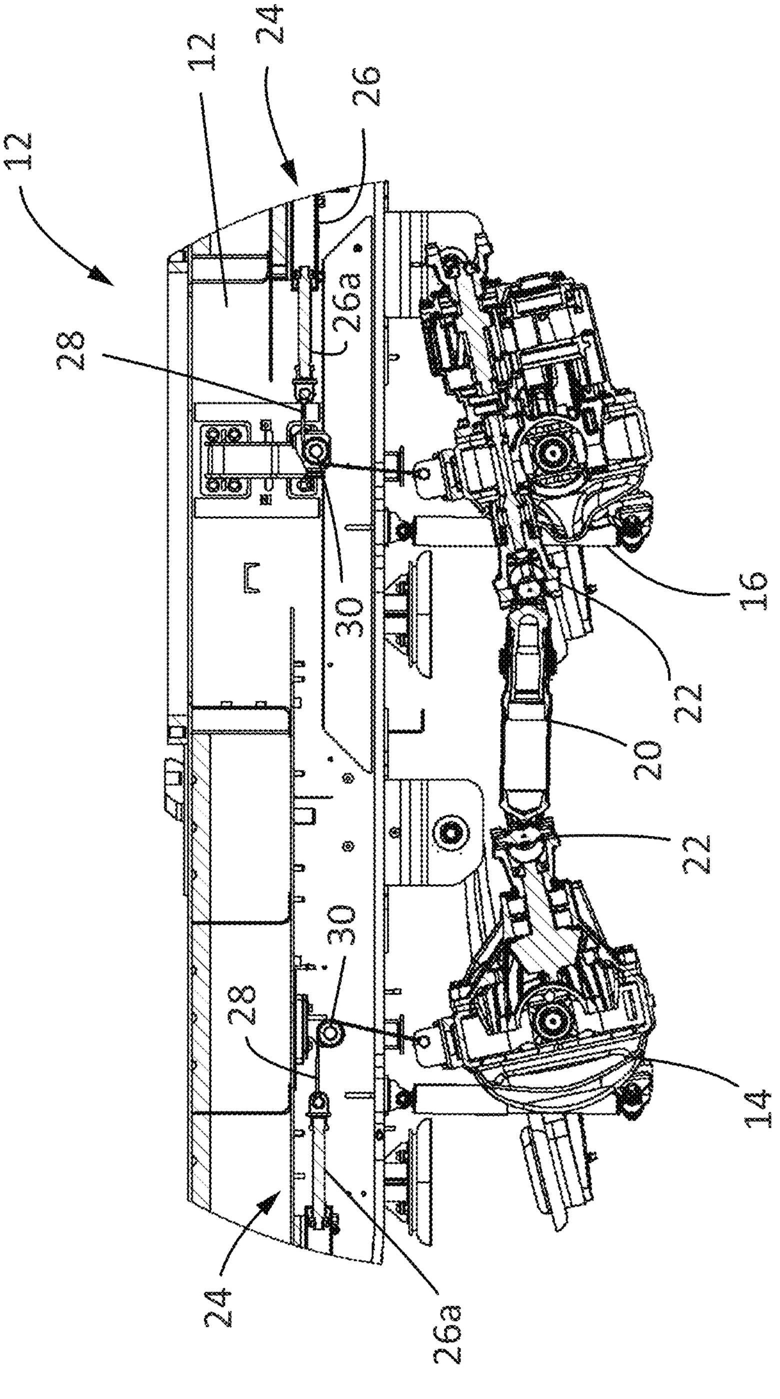
FIG. 4 is a partially cutaway side view illustrating one example of the implementation of lifters for lifting the axles.
Figure 5:
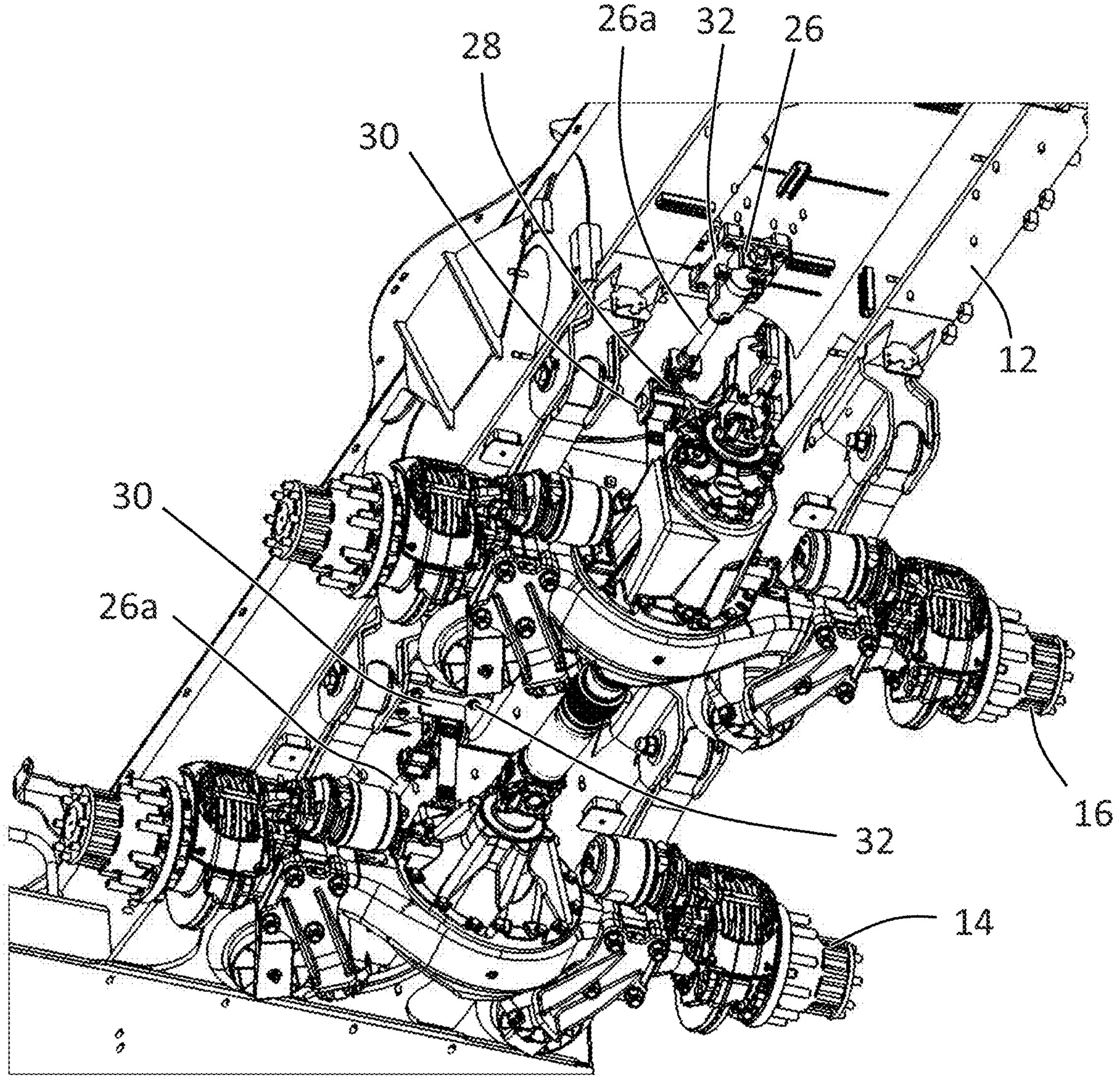
FIG. 5 is a partially cutaway bottom view of the axles and crane chassis.

According to one aspect of this disclosure, and with reference to FIGS. 4 and 5, the axles 14, 16 may each be adapted for being selectively raised and lowered relative to the chassis 12 independent of the suspension system. This may be achieved by a lifter 24 associated with each axle 14, 16. In particular, each lifter 24 comprises an actuator, which may comprise a generally horizontally arranged cylinder 26 (which may be hydraulic) attached to the underside of the chassis 12.

A connector is connected to the lifter 24 and the corresponding axle 14. Specifically, the connector may comprise a flexible structure, such as a webbing or strap 28, but could instead comprise a cable, chain, rope, or like flexible structure for interconnecting two objects. This strap 28 may be secured to the rod end 26*a* of the cylinder 26, such as by being wrapped around a clevis pin or like connector associated therewith (such as by a sewn or riveted loopback, thus establishing a permanent connection in this example). The strap 28, which may comprise a strong, woven polymeric material (e.g., nylon), further extends over a bearing, such as a roller 30, and connects at the opposite end with the axle 14, which may likewise include a clevis pin or similar connector about which the strap end is fastened in a similar manner. Suitable brackets 32 may be used to secure both the actuator or cylinder 26 and the bearing or roller 30 to the crane chassis 12.

A similar lifter 24 may also be provided on axle 16, and connected thereto using a similar strap 28. However, the actuator associated with the lifter 24, which again may comprise a horizontally arranged cylinder 26, may be arranged such that the rod 26 moves in the opposite direction of the cylinder associated with axis 14. This configuration is considered optional, as it is possible for the rods of both cylinders to extend or retract in the same direction.

Figure 1:
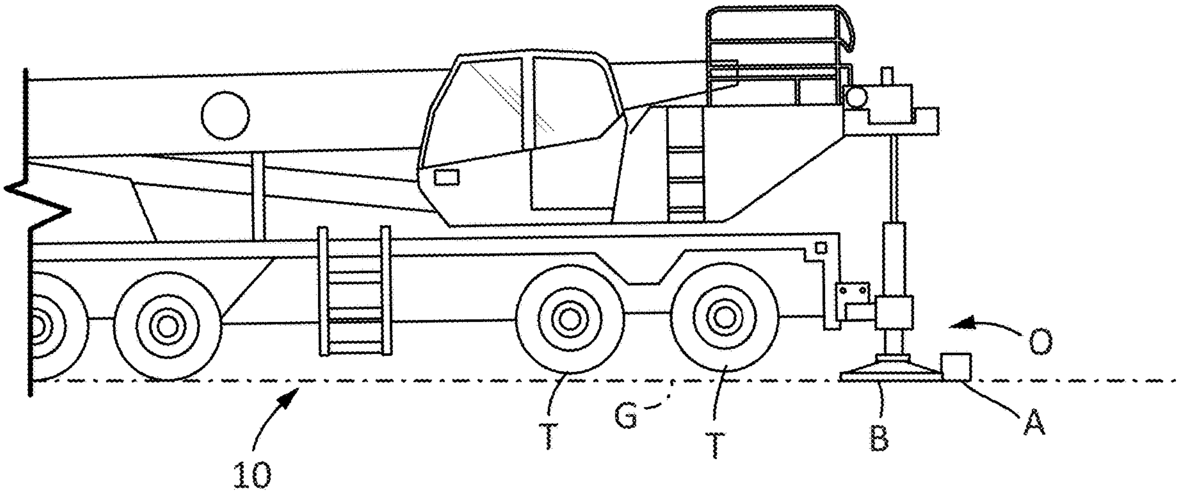
FIGS. 1 and 2 are schematic views illustrating the "dock walk" phenomenon.
Figure 2:
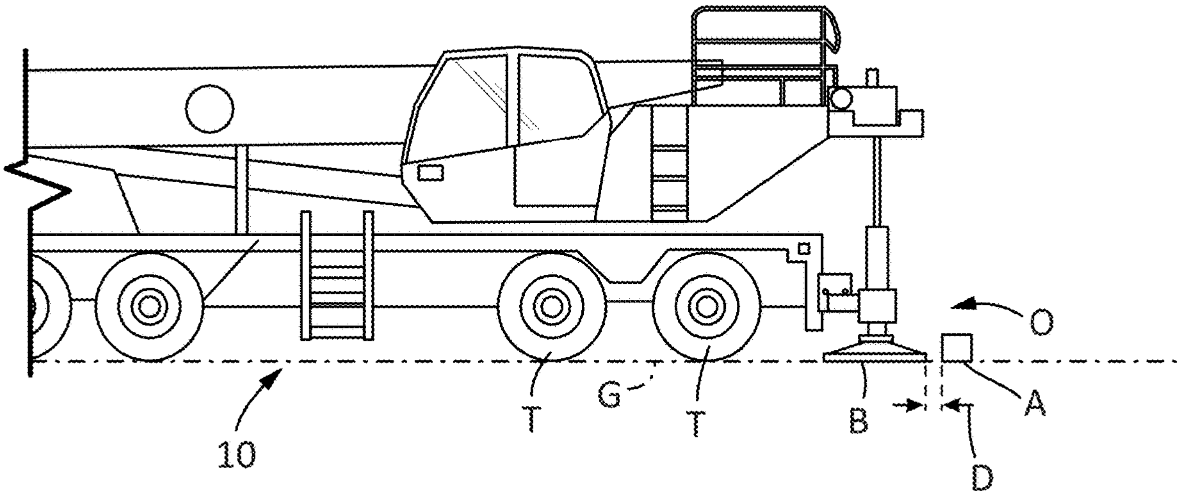
Figure 6:
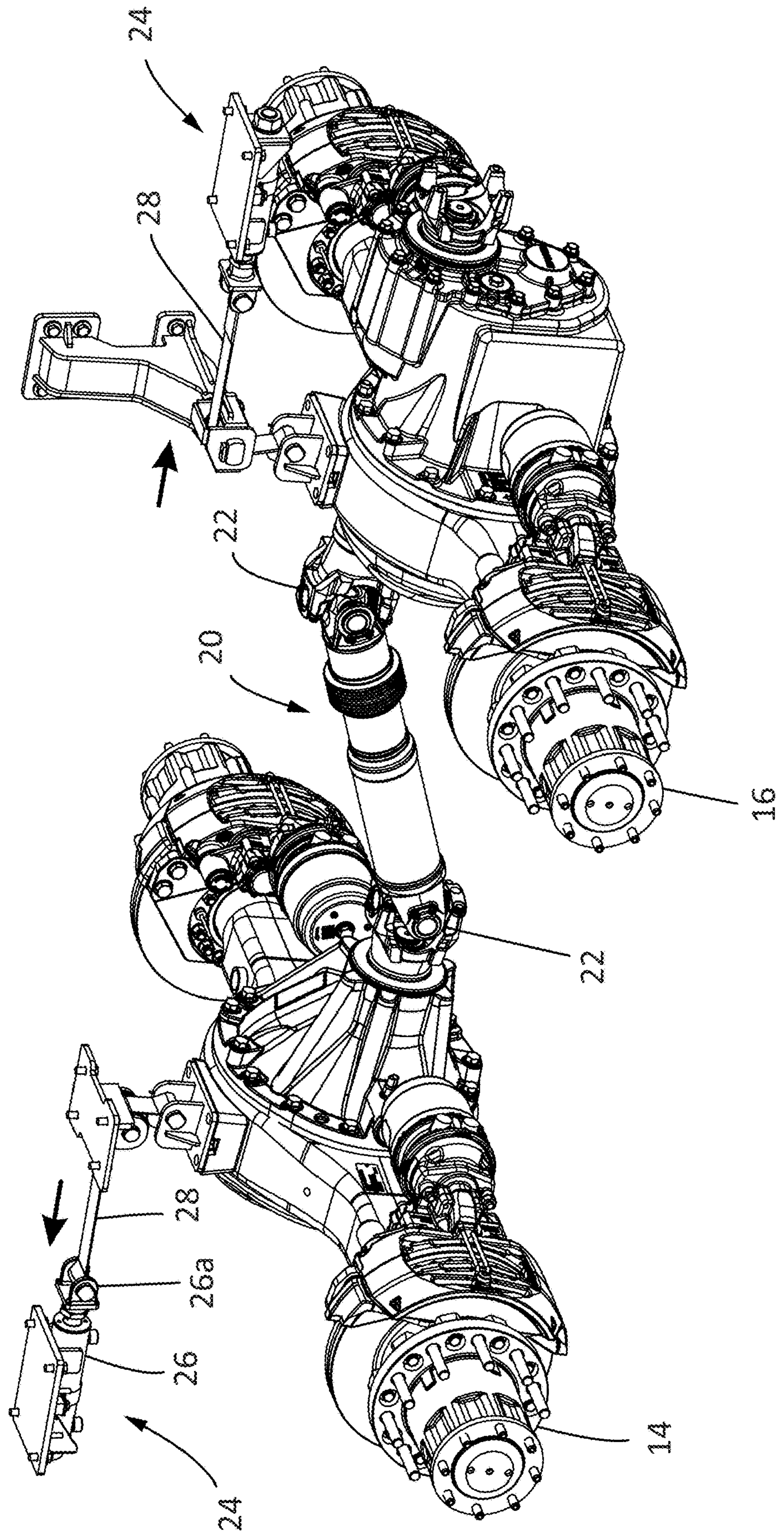
FIG. 6 is a perspective view of the axles and lifters shown separate from the crane for purposes of illustration, with the lifters being actuated to raise the axles.

In use, once the crane 10 is supported on the outriggers O (see FIGS. 1 and 2), the cylinders 26 associated with the axles 14, 16 via straps 28 may be actuated, such as by a control (e.g., switch or button associated with a PLC, computer, or the like) associated with the crane cab or otherwise accessible to the crane operator. As indicated in FIG. 6, this actuation moves or retracts the associated rod 26 from an extended (home) position associated with a lowered position of the axles 14, 16 to a retracted position (as indicated by the action arrows). This movement in turn serves to pull or retract the associated strap 28, and thus raise the associated axles 14, 16.

During this lifting or raising, the axles 14, 16 remain connected to the drive shaft 20, which may flex in view of the presence of the universal joints 22, and may also extend and collapse by telescoping movement. Use of the crane 10 for lifting loads may then proceed with full stable support provided by the outriggers O during the operation.

Figure 7:
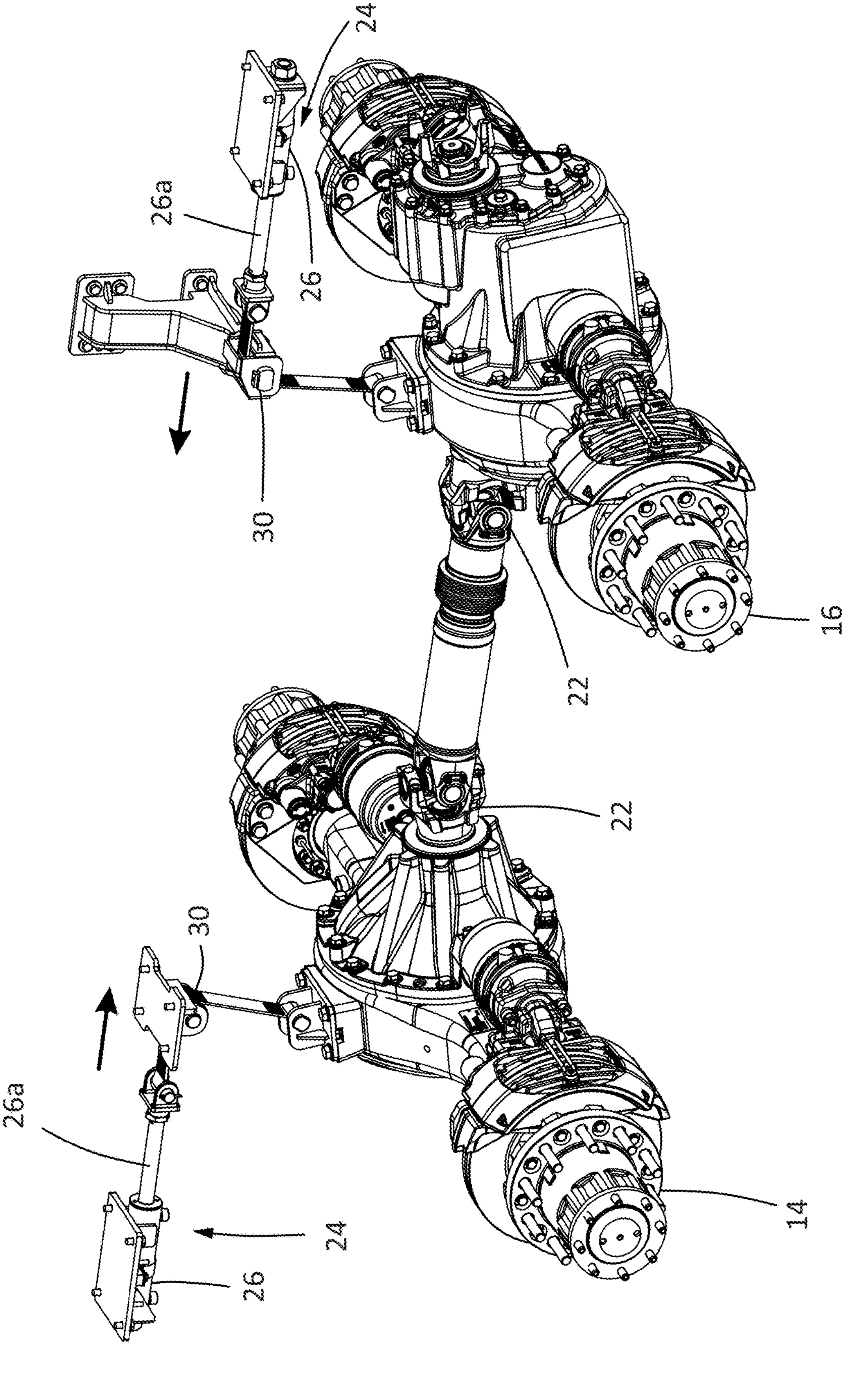
FIG. 7 is a perspective view of the axles and lifters shown separate from the crane for purposes of illustration, with the lifters being actuated to lower the axles.

When it is desired to return the axles 14, 16 to the lowered position, such as when the lifting or loading of the crane 10 is completed, the operation may simply reversed. Specifically, as shown in FIG. 7, the rods 26*a* of the cylinders 26 may be extended (passively or actively). This relaxation concurrently lowers the axles 14, 16 by virtue of the connection with the straps 28. With the lowering of the outriggers O the wheels and associated tires T then engage the ground G. Alternatively, the cylinders 26 may simply be allowed to "float" instead of being actively extended, which allows the straps 28 to return the axles 14, 16 to the lower position once the crane 10 engages in over-the-road travel and a depression, such as a pot hole, is encountered. In any case, as a result of the application of the concepts disclosed herein, the crane 10 does not experience significant (or any) dock walk as a result of the employment of the lifting system for raising and lowering the axles 14, 16.

As can be appreciated, the axle lifting system disclosed herein thus provides for a simple yet effective manner of raising axles 14, 16 when not in use, such as when the crane 10 is supported by outriggers O, and then lowering the axles 14, 16 for over-the-road transport. A flexible connector may take the form of a strap 28 that connects the axles 14, 16 with horizontally arranged cylinders 26, thus avoiding the need for excessive clearance in order to perform the axle lifting and lowering operation. The ability to make these connectors, or straps 28, permanent avoids the need for establishing (or re-establishing) a connection with the axles 14, 16 during a lifting or lowering operation, and thus provides for enhanced efficiency and flexibility, regardless of the mode in which the crane is used during the set-up procedure (e.g., with or without cribbing). The resulting arrangement is simple in construction, inexpensive to implement, and easy to use to achieve the desired operation, while reducing or eliminating the dock walk phenomenon.

The foregoing description of certain embodiments provides an illustration of the principles of the invention and its practical application to thereby enable one of ordinary skill in the art to utilize the invention in various embodiments and with various modifications as are suited to the particular use contemplated. For example, while a mobile crane with a telescoping boom is shown in the figures, it can be appreciated that the disclosed aspects may be applied to any type of lifting vehicle in need of transitioning between stable support, such as by outriggers, during lifting, and rolling support, such as by tires, during travel. All such modifications and variations are within the scope of the invention as determined by the appended claims when interpreted in accordance with the breadth to which they are fairly, legally and equitably entitled.

Each of the following terms written in singular grammatical form: "a", "an", and the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase "consisting essentially of." Each of the phrases "consisting of" and "consists of, as used herein, means "including and limited to". The phrase "consisting essentially of" means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

Terms of approximation, such as the terms about, substantially, approximately, generally, etc., as used herein, refer to ±10% of the stated numerical value or as close as possible to a stated condition.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

The invention claimed is:

1. A system for lifting an axle on a lifting machine, the system comprising:

a lifter for raising or lowering the axle relative to the ground, the lifter comprising a strap for connecting with the axle, wherein the lifter is adapted for raising or lowering the axle by virtue of pulling the strap, and wherein the axle is adapted to rise as a result of the strap being pulled by the lifter between an extended position and a retracted position.

2. The system of claim 1, wherein the lifter further includes a cylinder including a rod, the rod being connected with the axle via the strap, and wherein the rod is adapted for substantially horizontal movement for raising the axle by pulling on the strap and lowering the axle by releasing the strap.

3. The system of claim 2, further including a bearing for supporting the strap during the raising and lowering of the axle.

4. The system of claim 3, wherein the bearing comprises a roller.

5. A crane including the system of claim 1.

6. A crane including the system of claim 1, associated with each of at least two axles of the crane.

7. A system for lifting one or more axles on a lifting machine, the system comprising:

a lifter for raising or lowering the one or more axles relative to the ground, the lifter comprising a cylinder including a rod adapted for substantially horizontal movement for raising or lowering the one or more axles, wherein the rod is attached to a first end of a flexible connector, and wherein a second end of the flexible connector is connected with the one or more axles.

8. The system of claim 7, wherein the flexible connector comprises a strap.

9. The system of claim 7, further including a bearing for supporting the flexible connector during the lifting and lowering of the one or more axles.

10. The system of claim 9, wherein the bearing comprises a roller.

11. A crane including the system of claim 7.

12. A crane including the system of claim 7, associated with at least two axles of the crane.

13. A lifting machine for raising and lowering loads, comprising:

a crane, the crane comprising:

a chassis;

a boom supported by the chassis for raising and lowering loads;

a first axle connected to the chassis; and a first lifter for raising or lowering the first axle, the first lifter comprising a first flexible connector for connecting with the first axle and a first cylinder including a first rod adapted for substantially horizontal movement for raising or lowering the first axle, and a first bearing for supporting the flexible connector during the lifting and lowering of the axle, wherein the first rod is attached to a first end of the first flexible connector, and wherein a second end of the first flexible connector is connected with the first axle.

14. The lifting machine according to claim 13, further including:

a second axle connected to the chassis; and a second lifter for raising or lowering the second axle.

15. The lifting machine according to claim 14, wherein the second lifter comprises a second flexible strap for connecting with the second axle and a second cylinder including a second rod adapted for substantially horizontal movement for raising or lowering the second axle, and a second bearing for supporting the second flexible strap during the lifting and lowering of the axle.

16. The lifting machine according to claim 15, wherein the first rod and second rod are arranged to move in opposite directions upon actuation of the first cylinder and second cylinder, respectively.

17. The lifting machine according to claim 13, further including a drive shaft connecting the first and second axles.

18. The lifting machine according to claim 13, further including a suspension system connecting the first axle to the chassis.

19. The lifting machine according to claim 13, further including a flexible drive shaft connecting the first and second axles.

20. The lifting machine according to claim 13, further including outriggers for raising and lowering the chassis.

* * * * *